Aug. 1, 1933.   M. H. McEWAN   1,920,872
REGENERATIVE FURNACE
Filed April 20, 1929   2 Sheets-Sheet 2
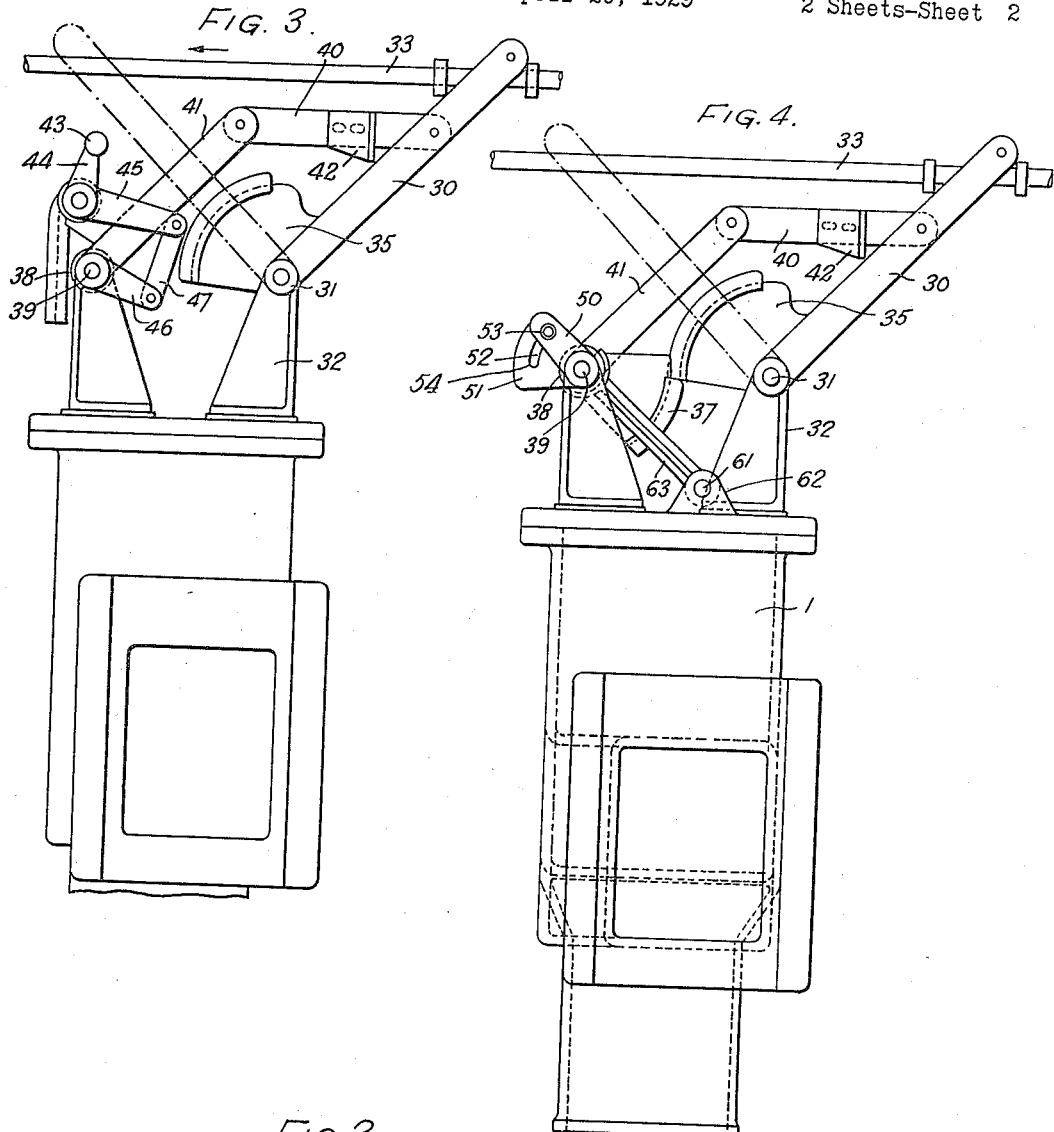
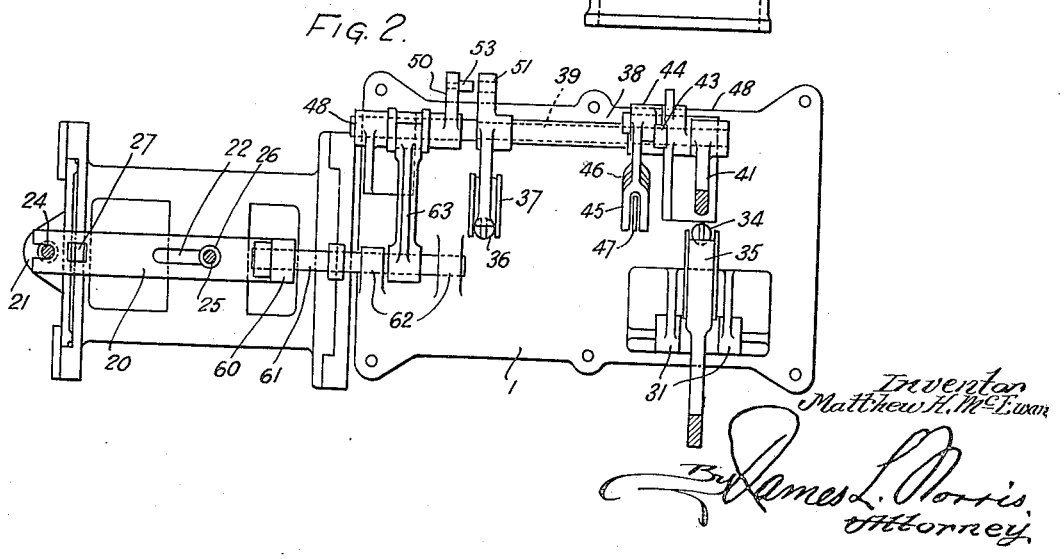

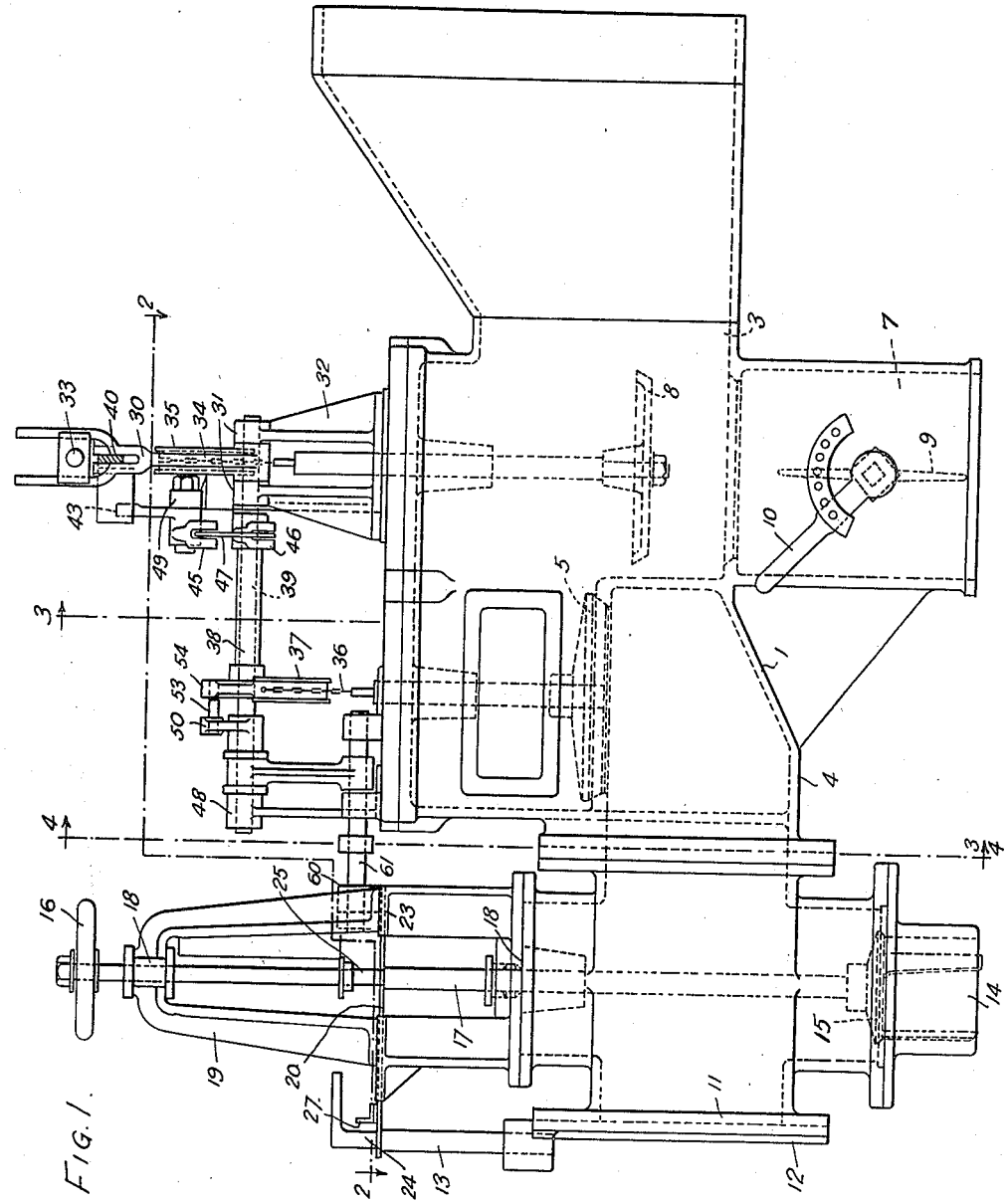

Patented Aug. 1, 1933

1,920,872

UNITED STATES PATENT OFFICE 1,920,872

REGENERATIVE FURNACE

Matthew Hamilton McEwan, London, England

Application April 20, 1929, Serial No. 356,773, and in Great Britain April 28, 1928

11 Claims. (Cl. 137—144)

This invention relates to regenerative furnaces, such as coke ovens or the like, adapted to be fired with rich gas or lean gas at will. As is well known, in firing with lean gas it is usual to preheat both the lean gas and the combustion air, whereas in firing with rich gas only the combustion air is preheated, and in furnaces adapted for firing by either method, it is the practice to provide one or more of the regenerators associated with the furnace with means whereby they can be supplied with air or with lean gas at will. The reversal mechanism of a regenerator generally comprises a box or duct in permanent communication with the regenerator and having an inlet valve governing the admission to the regenerator of gaseous fluid to be preheated and an exhaust valve governing the passage of waste products of combustion to the waste gas flue, either one valve or the other being open, dependent upon whether the regenerator is traversed by waste products of combustion passing to the waste-heat flue, or by gaseous fluid passing to the place of combustion. In the case of a regenerator adapted for preheating air or lean gas at will, it is the practice to provide separate inlet valves for governing the passage to the regenerator of air and lean gas, respectively, the appropriate inlet valve being operated at each reversal, depending upon the mode of firing in operation, and the other inlet valve remaining closed until it is desired to change the mode of firing. When, as is usually the case, for instance, in coke oven batteries, the inlet valves of a number of regenerators are operated by a common mechanism, either separate mechanisms are required for the gas and air inlet valves, or means must be provided for rendering the mechanism operative only in respect of one inlet valve of a regenerator and inoperative in respect of the other inlet valve.

This invention provides a construction wherein the same inlet valve governs the admission to a regenerator of the appropriate gaseous fluid (either air or lean gas) independently of the mode of firing in operation. According to the invention, the inlet valve controls communication between the regenerator and a box or the like having valve-controlled communications with a source of air, and a source of lean gas respectively. The valves controlling communication of the box with the sources of air and lean gas are set, in accordance with the mode of firing adopted, so that either air or lean gas is admitted to the box, and said valves, when once set, do not require manipulation as long as the particular mode of firing is in operation, whilst the inlet valve is operated at each reversal of the regenerator, regardless of whether the latter is to preheat air or lean gas.

In the preferred construction, the box is provided, on the side of the inlet valve remote from the interior of the box, with an extension in which the waste-gas valve is accommodated, so that the box, extension, and the several valves constitute an individual unit. Such a unit comprises a casing having two compartments, communication between which is controlled by the inlet valve, one compartment having a valve controlled communication with the waste-gas flue and being permanently in communication with the regenerator, whilst the other compartment has valve-controlled communications with sources of air and lean gas, respectively. Conveniently the mechanism for operating the valves is mounted on the casing and forms a part of the unit.

In order to avoid the possibility of admitting both gas and air to the box or compartment simultaneously, the invention comprises a device, which locks either the gas valve or the air valve in the closed position as long as the other valve is open. One form of construction comprises a slide having slots capable of engaging constricted portions of the stems of the valves (or their equivalents, such as the operating handle of a sliding plate), the arrangement being such that at all times one or other valve is locked in closed position and cannot be released whilst the other valve is open. Any risk of admitting a mixture of gas and air to the hot regenerator is thereby obviated.

In changing over a regenerator from a period of receiving heat from combustion products to a period of preheating air or fuel gases, or vice versa, it is desirable that there should be an interval between the operation of the waste-gas valve and the operation of the inlet valve, and a construction in accordance with the invention may be combined with a reversal mechanism wherein the two valves are operated by a single actuating mechanism which automatically allows for the aforesaid interval. For example, the valves may be actuated by a rotatable member such as a lever adapted to be rotated by a suitable mechanism first in one direction and then in the opposite direction, at intervals corresponding with the preheating and heating periods, the initial stage of the rotation of the member determining the closing of one valve and a subsequent stage of the rotation determining the opening of the other valve.

Practical considerations require that the interval between the operation of the valves in changing over a regenerator should be less when air is to be preheated than when gas is to be preheated, and the invention further comprises a construction whereby the actuating mechanism may operate to open one valve through either of two devices, which come into operation at different intervals after the operation of the other valve. Conveniently the position of the locking slide previously referred to determines the interval between the operation of the valves, whereby it is possible to ensure automatically that the interval between the operation of the inlet and waste-gas valves shall be suited to the particular medium which is to be preheated.

The accompanying drawings illustrate an apparatus constructed in accordance with this invention, Fig. 1 being a side elevation, Fig. 2 a horizontal cross section on the line 2—2 of Fig. 1, Fig. 3 a vertical section on the line 3—3 of Fig. 1, and Fig. 4 vertical section on the line 4—4 of Fig. 1, with some parts omitted.

Referring to Figs. 1 and 2, the apparatus comprises a box or casing 1 divided by a wall 2 into two compartments 3 and 4 communicating by way of a port in the wall 2 closable by the inlet valve 5. The compartment 3 is permanently in communication with a regenerator (not shown) by way of a duct 6 and can be placed in communication with the waste-gas flue by way of a duct 7 closable by means of the waste-gas valve 8; the duct 7 may contain a suitable damper 9 operated by a handle 10. The compartment 4 may be placed in communication at will either with the atmosphere by way of a port 11 which can be closed by a sliding plate 12 operated by means of a handle 13, or with the gas main (not shown) by way of a port 14 which can be closed by means of a screw-down valve 15 operated by rotation of a wheel 16 mounted on the valve-stem 17, which is supported in guides 18 in a bracket 19 mounted on the casing 1. In the construction illustrated, the valves are set for the passage of waste gases from the regenerator to the waste-gas flue, that is to say, the waste-heat valve 8 is open and the inlet valve 5 is closed. In changing over the regenerator from a heating period, in which it is traversed by hot gases, to a pre-heating period, in which it is traversed by air or gas to be preheated, the valve 8 is closed and the valve 5 is opened (by mechanism presently to be described) whilst either the slide 12 or the valve 15 is opened, depending upon whether air or gas is to be admitted, by way of compartments 4 and 3, to the regenerator.

For the purpose of ensuring that valve 15 and plate 12 cannot simultaneously be open, there is provided a locking device comprising a slide 20 slotted at 21 and 22 and movable longitudinally in guideways 23 in the bracket 19. The width of the slots 21, 22 is less than the normal diameter of the valve-stem 17 and handle 13, but the latter have constricted portions 24, 25 which are capable of entering the slots 21 and 22 respectively.

The dimensions of the slide and slots and the position of the constrictions on the handle 13 and valve-stem 17 are such that the slots can only engage the constrictions whilst the plate and valve are closed and that at all times one or other of the slots must be in engagement with the corresponding constriction. Whilst both valve 15 and plate 12 are closed, the slide may be moved freely between its extreme right position in which the slot 21 is disengaged from the constriction 24 (as in Fig. 2) in and its extreme left position (as in Fig. 2) in which the constriction 25 is positioned in an enlarged recess 26 at one end of slot 22, which recess is capable of accommodating the portion of the valve stem 17 below the constriction 25. In the extreme right position, it will be seen that when the plate 12 is raised and an unconstricted portion of the handle is brought opposite to the slot 21, the slide 20 cannot be moved to disengage slot 22 from the constriction 25 so that the gas-valve 15 is locked in closed position; similarly, in the extreme left position the action of opening the valve 15 brings an unconstricted portion of the valve-stem into the recess 26, and prevents movement of the slide 20 to disengage the constriction 24 from the slot 21, thus locking the plate 12 in closed position. The slide is moved by means of a handle 27.

The reversal mechanism for changing over the regenerator from a preheating period to a heating period and vice versa is actuated by a lever 30 pivoted at one end in bearings 31 in a bracket 32 on the casing 1, and connected at or near its other end to a rod or rope 33 (common to the reversal mechanism of a number of regenerators) which is moved at suitable intervals alternately in one direction and in the other direction by a suitable mechanism (not shown). The waste-gas valve 8 is suspended by a chain 34 (Fig. 1) attached at a point on the periphery of a quadrant 35 integral with the lever 30, and is operated by rotation of the lever 30 about its axis. The inlet valve 5 is suspended by a chain 36 secured on the periphery of a quadrant 37 mounted on a sleeve 38 which can rotate freely on a shaft 39 carried in bearings 48; the shaft 39 is itself rotated by movement of the lever 30 through the intermediary of a link 40 pivotally attached to the lever and to an arm 41 extending from the shaft 39.

In the position of lever 30 as shown in Figs. 3 and 4, the rod and lever are in their extreme right position, and the waste-gas valve 8 is raised from its seat, the inlet valve 5 being closed. When it is desired to change over the regenerator to a preheating period, the rod 33 is moved in the direction of the arrow (Fig. 3) whereby the lever 30 and quadrant 35 are caused to rotate in the counter-clockwise direction and the waste-gas valve 8 is lowered on to its seating. Before the lever 30 reaches the end of its travel (shown approximately in dotted lines in Fig. 4) a boss 42 (Fig. 3) mounted adjustably on the link 40 comes into contact with and bears on an arm 43 formed integrally with a member 44 rotatably mounted on a support 49, the further movement of the lever 30 to the end of its travel thus causing rotation of the arm 43 and the member 44. By means of an arm 45 formed integrally with the member 44, an arm 46 secured to the sleeve 38 and a link 47 pivotally connected with the free ends of arms 45, and 46, rotation of the member 44 is communicated to the sleeve 38 carrying the quadrant 37 and the inlet valve 5 thus raised from its seating. The dimensions and arrangement of the several parts are so selected that a suitable interval elapses between the closing of the waste-gas valve and the opening of the inlet valve; this interval may be varied within limits by suitably adjusting the position of the boss 42 on the link 40. In the reverse movement of the rod 33, retraction of the boss 42 permits the inlet valve 5 to descend on to its seating before the waste-gas valve 8 opens.

The construction also embodies a clutch mechanism whereby rotation of the shaft 39 may be transmitted directly to the sleeve 38. The clutch mechanism comprises a member 50 keyed to the shaft 39 so as to rotate therewith and free to slide longitudinally along the shaft, and a plate 51 secured to the sleeve 38 and having an arcuate slot 52 (Fig. 4) concentric with the sleeve. The clutch is closed by sliding the member 50 along the shaft 39 to cause a stud 53 carried by the member 50 to enter the slot 52, whilst the lever 30 is in the position shown in Figs. 3 and 4. Rotation of the lever in the counterclockwise direction is transmitted to the shaft 39 and clutch member 50 through links 40, 41. The initial rotation of the shaft 39 causes the stud 53 to travel in the arcuate slot 52 until it reaches the end 54, when further rotation of the shaft is transmitted to the sleeve 38 and quadrant 37 through the clutch mechanism, whereby the inlet valve 5 is raised from its seating. The distance of travel of the stud 53 in the slot 52 is such that, when the clutch is closed, the clutch mechanism takes precedence of the boss and arm mechanism (42 and 43) which operates as previously described when the clutch is open and is inoperative when the clutch is closed, and that a desired interval elapses between the actuation of the waste-gas and inlet valves 8 and 5. It will be seen that the rotation of the member 44 is somewhat magnified in its transmission through the arms 45, 46 and link 47 to the sleeve 38; that is to say, the angular rotation of the sleeve 38 is somewhat greater than the corresponding angular rotation of the member 44. By suitably dimensioning the several parts, it is possible to arrange that the inlet valve has substantially the same travel whether actuated through the boss and arm mechanism or through the clutch mechanism.

The clutch is conveniently controlled by the movement of the locking slide 20. For this purpose, the slide carries a bracket 60 to which is secured a rod 61 sliding in bearings 62 mounted on the casing 1; an arm 63, secured at one end to the rod 61 and having its other end mounted rotatably on the clutch member 50, transmits movement of the slide to the clutch member, the arrangement being such that movement of the slide into a position to permit opening of the air slide 12 closes the clutch whilst movement of the slide into a position to permit opening of the gas valve 15 frees the clutch.

It will be seen that, whether the clutch mechanism is open or closed, the waste-gas valve 8 and the inlet valve 5 both derive their movement from the rotation of the lever 30 about its pivot.

Having thus fully described the nature of the said invention and the best means I know of carrying the same into practical effect, I claim:—

1. Apparatus for controlling the supply of gaseous fluid to a regenerator of a regenerative furnace, such as a coke oven or the like, adapted to be fired by rich gas or by lean gas, comprising a box having communications with a source of air and a source of lean gas respectively, valves controlling said communications, a device cooperating with said valves and adapted to maintain either of said valves locked in closed position as long as the other of said valves is open, and an inlet valve controlling communication between the box and the regenerator and governing the admission to the regenerator of the lean gas or air admitted to the box.

2. Apparaus for controlling the supply of gaseous fluid to a regenerator of a regenerative furnace, such as a coke oven or by lean gas, comprising a casing divided into two compartments, communications between one compartment and sources of air and lean gas, respectively, valves controlling said communications, a device cooperating with said valves and adapted to maintain either of said valves locked in closed position as long as the other of said valves is open, communications between the other compartment and the regenerator and a waste gas flue, respectively, a waste-gas valve controlling communication between the said compartment and the waste gas flue, a communication between the two compartments, and an inlet valve controlling the last-named communication.

3. Apparatus for controlling the supply of gaseous fluid to a regenerator of a regenerative furnace, such as a coke oven or the like, adapted to be fired by rich gas or by lean gas, comprising a box having communications with a source of air and a source of lean gas respectively, valves controlling said communications, a slide having slots capable of engaging parts of said valves so as to lock either valve in closed position, and so positioned and dimensioned that when in locking engagement with either valve, it is prevented from disengagement therewith as long as the other valve is open, and an inlet valve controlling communication between the box and the regenerator and governing the admission to the regenerator of the lean gas or air admitted to the box.

4. Apparatus for controlling the supply of gaseous fluid to a regenerator of a regenerative furnace, such as a coke oven or the like, adapted to be fired by rich gas or by lean gas, comprising a casing divided into two compartments, communications between one compartment and sources of air and lean gas respectively, valves controlling said communications, a slide having slots capable of engaging parts of said valves so as to lock either valve in closed position, and so positioned and dimensioned that, when in locking engagement with either valve, it is prevented from disengagement therewith as long as the other valve is open, communications between the other compartment and the regenerator and a waste-gas flue respectively, a waste gas valve controlling communication between the said compartment and the waste gas flue, a communication between the two compartments, and an inlet valve controlling the last-named communication.

5. Apparatus for controlling the supply of gaseous fluid to a regenerator of a regenerative furnace, such as a coke oven or the like, adapted to be fired by rich gas or by lean gas, comprising a box having valve-controlled communications with a source of air and a source of lean gas respectively, an inlet valve controlling communications between the box and the regenerator and governing the admission to the regenerator of lean gas or air supplied to the box, a waste gas valve controlling communication between the regenerator and a waste gas flue, and a reversal mechanism for actuating the inlet and waste gas valves, which mechanism comprises a member adapted to rotate between two extreme positions and means whereby the earlier stage of the rotation from either position to the other determines the closing of one of said valves and a later stage of the said rotation determines the opening of the other of said valves.

6. Apparatus for controlling the supply of gaseous fluid to a regenerator of a regenerative furnace, such as a coke oven or the like, adapted to be fired by rich gas or by lean gas, comprising a box having valve-controlled communications with a source of air and a source of lean gas respectively, an inlet valve controlling communication between the box and the regenerator and governing the admission to the regenerator of lean gas or air supplied to the box, a waste gas valve controlling communication between the regenerator and a waste gas flue, and a reversal mechanism for actuating the inlet and waste gas valves, which mechanism comprises a member adapted to rotate between two extreme positions, means whereby rotation of said member actuates one of said valves, an arm rotatable about a pivot, and means whereby rotation of said arm actuates the other of said valves, said member and said arm being so positioned that the earlier stage of the rotation of the member from its extreme position in which the valve actuated thereby is open towards its other extreme position causes a part of the member to move into contact with said arm, and the further rotation of the member causes rotation of the arm so as to open the valve actuated thereby.

7. Apparatus for controlling the supply of gaseous fluid to a regenerator of a regenerative furnace, such as a coke oven or the like, adapted to be fired by rich gas or by lean gas, comprising a box having valve-controlled communications with a source of air and a source of lean gas, respectively, an inlet valve controlling communication between the box and the regenerator and governing the admission to the regenerator of lean gas or air supplied to the box, a waste gas valve controlling communication between the regenerator and a waste gas flue, and a reversal mechanism for actuating the inlet and waste gas valves, which mechanism comprises a member adapted to rotate between two extreme positions, means whereby rotation of said member actuates one of said valves, a rotatable shaft, means whereby rotation of said shaft actuates the other of said valves, duplicated transmission means for imparting rotation of said member to said shaft, which means are adapted to become operative at different instants during the rotation of the member from its extreme position in which the valve actuated thereby is open towards its other extreme position, and means whereby rotation of the member is imparted to the shaft by either of said transmission means.

8. Apparatus for controlling the supply of gaseous fluid to a regenerator of a regenerative furnace, such as a coke oven or the like, adapted to be fired by rich gas or by lean gas, comprising a box having valve-controlled communications with a source of air and a source of lean gas, respectively, an inlet valve controlling communication between the box and the regenerator and governing the admission to the regenerator of lean gas or air supplied to the box, a waste gas valve controlling communication between the regenerator and a waste gas flue, and a reversal mechanism for actuating the inlet and waste gas valves, which mechanism comprises a member adapted to rotate between two extreme positions, means whereby rotation of said member actuates one of said valves, a rotatable shaft, means whereby rotation of said shaft actuates the other of said valves, an arm rotatable about a pivot, means for imparting rotation of said arm to said shaft, said arm and said member being so positioned that the earlier stage of the rotation of the member from its extreme position in which the valve actuated thereby is open towards its other extreme position causes a part of said member to move into contact with said arm and the further rotation of the member causes rotation of the arm, and a clutch mechanism adapted to transmit rotation of said member to said shaft and operative, when the clutch is closed, before the part of said member comes into contact with said arm.

9. Apparatus for controlling the supply of gaseous fluid to a regenerator of a regenerative furnace, such as a coke oven or the like, adapted to be fired by strong gas or by lean gas, comprising a box having communications with a source of air and a source of lean gas respectively, valves controlling said communications, a slide having slots capable of engaging parts of said valves as to lock either valve in closed position, and so positioned and dimensioned that when in locking engagement with either valve, it is prevented from disengagement therewith as long as the valve is open, an inlet valve controlling communication between the box and the regenerator and governing the admission to the regenerator of the lean gas or air admitted to the box, a waste gas valve controlling communication between the regenerator and a waste gas flue, a reversal mechanism for actuating the inlet and waste gas valves, which mechanism comprises a member adapted to rotate between two extreme positions, means whereby rotation of said member actuates one of said valves, a rotatable shaft, means whereby rotation of said shaft actuates the other of said valves, an arm rotatable about a pivot, means for imparting rotation of said arm to said shaft, said arm and said member being so positioned that the earlier stage of the rotation of the member from its extreme position in which the valve actuated thereby is open towards its other extreme position causes a part of said member to move into contact with said arm and the further rotation of the member causes rotation of the arm, and a clutch mechanism adapted to transmit rotation of said member to said shaft and operative when the clutch is closed, before the part of said member comes into contact with said arm and means whereby the closing of the clutch is determined by movement of the slide into locking engagement with the lean gas valve.

10. Apparatus for controlling the supply of gaseous fluid to a regenerator of a regenerative furnace, such as a coke oven or the like, adapted to be fired by a strong gas or by lean gas, comprising a casing divided into two compartments, communications between one compartment and sources of air and lean gas respectively, valves controlling said communications, a slide having slots capable of engaging parts of said valves so as to lock either valve in closed position and so positioned and dimensioned that when in locking engagement with either valve, it is prevented from disengagement therewith as long as the other valve is open, communications between the other compartment and the regenerator and a waste-gas flue respectively, a waste-gas valve controlling the communication between the said compartment and the waste-gas flue, a communication between the two compartments, an inlet valve controlling the last-named communication, a reversal mechanism for actuating the inlet and waste-gas valves, which mechanism comprises a member adapted to rotate between two extreme positions, means whereby rotation of said member actuates one of said valves, a rotatable shaft, means whereby rotation of said shaft actuates the other of said valves, an arm rotatable about a pivot, means for imparting rotation of said arm to said shaft, said arm and said member being so positioned that the earlier stage of the rotation of the member from its extreme position in which the valve actuated thereby is open towards its other extreme position causes a part of said member to move into contact with said arm and the further rotation of the member causes rotation of the arm, and a clutch mechanism adapted to transmit rotation of said member to said shaft and operative, when the clutch is closed, before the part of said member comes into contact with said arm, and means whereby the closing of the clutch is determined by movement of the slide into locking engagement with the lean-gas valve.

11. Apparatus for controlling the supply of gaseous fluid to a regenerator of a regenerative furnace, such as a coke oven or the like, adapted to be fired by rich gas or by lean gas, comprising a casing divided into two compartments, a valve-controlling communication between the compartments, an outlet in one compartment communicating with the exterior and adapted to be connected to a waste-gas flue of a regenerative furnace, a valve controlling said outlet, reversal mechanism adapted to actuate said valves to place the said compartment in communication alternately with the other compartment and, through said outlet with the exterior, said reversal mechanism comprising a member adapted to rotate between two extreme positions and means whereby the earlier stage of rotation from either of said positions to the other determines the closing of one of said valves and a later stage of the said rotation determines the opening of the other valve, a plurality of valve-controlled inlets in the other of said compartments adapted to be connected to sources of air and lean gas, and a second outlet in the first-named compartment adapted to be connected with the regenerator, the said reversal mechanism being mounted on the casing and with the casing and valves constituting a unit.

MATTHEW HAMILTON McEWAN.